United States Patent Office 3,457,279
Patented July 22, 1969

3,457,279
VINYLENE CARBONATE PRODUCTION
Sidney H. Metzger, Jr., Pittsburgh, Pa., assignor to Jefferson Chemical Company, Inc., Houston, Tex., a corporation of Delaware
No Drawing. Continuation-in-part of application Ser. No. 405,577, Oct. 21, 1964. This application Apr. 7, 1967, Ser. No. 629,113
Int. Cl. C07d *11/00;* C07c *69/00*
U.S. Cl. 260—340.2    5 Claims

ABSTRACT OF THE DISCLOSURE

Heretofore, vinylene carbonate has been prepared by the chlorination of ethylene carbonate, followed by dehydrochlorination. Vinylene carbonate has now been prepared by the direct catalytic dehydrogenation of ethylene carbonate.

CROSS-REFERENCE TO RELATED APPLICATION

This application is a continuation-in-part of copending application Ser. No. 405,577, filed Oct. 21, 1964, and now abandoned.

BACKGROUND OF THE INVENTION

This invention is concerned with the production of vinylene carbonate by the dehydrogenation of ethylene carbonate. Heretofore, vinylene carbonate has been prepared from chlorinated ethylene carbonate. For example, chloroethylene carbonate has been dehydrochlorinated to vinylene carbonate by treatment with triethylamine or by heating with calcium sulfate in the presence of glass beads. Vinylene carbonate has also been prepared from dichloroethylene carbonate by treatment with zinc. These prior art processes suffer from two serious disadvantages.

First, the only known method for the preparation of the chloro carbonates involves the chlorination of ethylene carbonate. The preparation of vinylene carbonate from ethylene carbonate, a readily available starting material, is thus a two-step process. This two-step process results in low yields of vinylene carbonate.

Second, the vinylene carbonate prepared by the previously known processes is very difficult to purify. In order to remove the small amounts of chloro derivatives in the product, it is necessary to treat the vinylene carbonate with sodium borohydride. Only after such a treatment is it possible to obtain vinylene carbonate of sufficient purity to permit one to prepare high molecular weight polymers.

SUMMARY OF THE INVENTION

I have now discovered that vinylene carbonate may be prepared by the direct catalytic dehydrogenation of ethylene carbonate using any of the metal-containing dehydrogenation catalysts well known in the prior art. This one-step process results in vinylene carbonate containing no chlorinated impurities.

Vinylene carbonate is a well-known, ethylenically unsaturated compound that polymerizes readily to form useful homopolymers and copolymers. In addition, vinylene carbonate forms Diels-Alder adducts and undergoes various other reactions at the double bond and at the ester linkages.

DESCRIPTION OF THE PREFERRED EMBODIMENT

The catalyst to be used in my invention may be any metal-containing dehydrogenation catalyst of the type well known to those skilled in the art. By metal-containing catalyst is meant one containing a metal of the group described below in the free state or in the form of an oxide. Such catalysts include, for example, the metals and oxides of the metals of Groups I–B, II–B and VIII of the Periodic Table and the oxides of the transition metals of Groups IV, V and VI. Specific examples of acceptable catalysts include silver, copper, zinc, iron, cobalt, palladium, platinum, nickel, ruthenium, rhodium, silver oxide, cupric oxide, zinc oxide, ferric oxide, platinum oxide, chromic oxide, titanium dioxide, molybdenum oxide and vanadium oxide. The catalyst may be unsupported, or supported on a material such as alumina, silica or carbon. The preferred catalysts for my process are those comprising zinc, iron, silver, zinc oxide, ferric oxide, silver oxide or mixtures thereof.

The temperatures to be employed in my process are within the range of from about 200° to about 550° C. The preferred temperature range is from about 300° to about 400° C. Since both ethylene carbonate and vinylene carbonate decompose under these conditions, the process is conducted in a continuous manner at flow rates of one to three grams of ethylene carbonate per milliliter of catalyst per hour.

The reaction is preferably conducted in the vapor phase. An inert diluent such as nitrogen may be employed. Hydrogen may also be included in the feed. By operating under pressure, the reaction may also be conducted in the liquid phase. Here, too, an inert diluent such as an aromatic hydrocarbon not susceptible to dehydrogenation may be employed.

My invention will be further illustrated by the following examples which are not intended to limit the invention in any respect.

Example I

Ethylene carbonate was passed continuously over a zinc catalyst (Harshaw Zn–0602, which is 10% zinc oxide and 10% chromium oxide on alumina) at the rate of 1.5 grams of ethylene carbonate per milliliter of catalyst per hour at a temperature of 300° C. with both hydrogen and nitrogen contained in the feed stream. The reaction mixture obtained was analyzed by vapor chromatography and was found to contain a substantial amount of vinylene carbonate as well as some unreacted ethylene carbonate.

Example II

Equivalent results were obtained when Example I was repeated using an iron catalyst (Harshaw Fe—0301, which is 20% ferric oxide on alumina) at a temperature of 385° C. employing no hydrogen.

Example III

Example I was repeated employing a catalyst consisting of alumina coated with silver at a temperature of 375° C. Again, a substantial amount of vinylene carbonate was obtained.

The vinylene carbonate may be separated from the reaction mixture by any convenient means. Distillation is an attractive means of separation since the boiling points of vinylene carbonate and ethylene carbonate differ greatly. For example, at 18 mm. pressure, vinylene carbonate boils at 60°–62° C., while ethylene carbonate boils at 125°–130° C.

I claim:

1. A process for the preparation of vinylene carbonate which comprises continuously passing ethylene carbonate over a metal-containing dehydrogenation catalyst at a temperature of from about 200° to about 550° C. at a flow rate of from about one to about three grams of ethylene carbonate per milliliter of catalyst per hour.

2. A process as in claim 1 wherein the catalyst is selected from the group consisting of zinc, iron, silver, zinc oxide, ferric oxide, silver oxide and mixtures thereof.

3. A process as in claim 2 wherein the reaction is conducted at a temperature within the range of from about 300° to about 400° C.

4. A process as in claim 1 wherein the ethylene carbonate is in the vapor phase.

5. A process as in claim 4 wherein a gaseous inert diluent is included in the feed stream.

References Cited

UNITED STATES PATENTS 3,156,702  11/1964  Hofermann et al. ___ 260—340.2

NORMA S. MILESTONE, Primary Examiner